(12) United States Patent
Bouvier et al.

(10) Patent No.: US 7,573,263 B2
(45) Date of Patent: *Aug. 11, 2009

(54) DEVICE FOR PUNCTUAL MEASUREMENT OF A RADIOFREQUENCY MAGNETIC FIELD WITH CONSTANT AMPLITUDE AND FREQUENCY

(75) Inventors: Jacky Bouvier, Meylan (FR); Philippe Geoffroy, Fontaine (FR)

(73) Assignee: Fahrenheit Thermoscope LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/514,289

(22) Filed: Aug. 31, 2006

(65) Prior Publication Data

US 2007/0126423 A1    Jun. 7, 2007

Related U.S. Application Data

(63) Continuation of application No. 10/380,756, filed as application No. PCT/FR01/02897 on Sep. 18, 2001.

(30) Foreign Application Priority Data

Sep. 19, 2000    (FR)    .................................... 00 11923

(51) Int. Cl.
*G01R 33/02* (2006.01)
*G06K 7/08* (2006.01)
*H04B 5/00* (2006.01)
*H04B 7/00* (2006.01)

(52) U.S. Cl. ...................... 324/260; 324/244; 455/41.1; 455/41.2; 235/440; 235/449; 235/450

(58) Field of Classification Search ................. 235/436, 235/438, 439, 449, 450, 440; 324/244, 260, 324/261, 262, 247, 256, 258; 340/572.1, 340/10.1; 455/41.1, 41.2
See application file for complete search history.

(56) References Cited

U.S. PATENT DOCUMENTS 4,267,522 A * 5/1981 Periot .......................... 331/65
4,887,033 A    12/1989 Langdon et al.

(Continued)

FOREIGN PATENT DOCUMENTS

GB    2154328    9/1985

(Continued)

OTHER PUBLICATIONS

Bouvier et al., A Smart Card CMOS Circuit with Magnetic Power and Communications Interface, (1997), 3 pages.*

(Continued)

*Primary Examiner*—Patrick J Assouad
*Assistant Examiner*—David M. Schindler

(57) ABSTRACT

The invention concerns a device for measuring a radiofrequency magnetic field, characterised in that it comprises on a common support: a coil forming a primary reception antenna; a voltage-controlled oscillator, monitored so that its output frequency depends on the amplitude of the magnetic field received on the coil forming primary antenna; an absorption modulation load connected to the oscillator output; a secondary antenna sensitive to the magnetic field influenced by the absorption modulation resulting from the power supply load by the voltage-controlled oscillator, and means for operating the available signal on the secondary antenna.

34 Claims, 2 Drawing Sheets

U.S. PATENT DOCUMENTS

| | | |
|---|---|---|
| 5,070,485 A | 12/1991 | Nyce |
| 5,546,445 A | 8/1996 | Jones et al. |
| 5,592,086 A | 1/1997 | Weinstock et al. |
| 5,841,123 A | 11/1998 | Thorigne et al. |
| 6,329,808 B1 | 12/2001 | Enguent |
| 6,528,989 B1 | 3/2003 | Hansen |
| 6,703,941 B1 | 3/2004 | Blaker |
| 6,837,438 B1 * | 1/2005 | Takasugi et al. ............ 235/492 |
| 6,963,372 B1 | 11/2005 | Hiyama et al. |
| 2003/0184288 A1 | 10/2003 | Bouvier et al. |

FOREIGN PATENT DOCUMENTS

| | | |
|---|---|---|
| WO | WO0025454 | 5/2000 |

OTHER PUBLICATIONS

Patent Abstracts of Japan, vol. 013, No. 306, Jul. 13, 1989, JP 01-080872, Asin Seiki Co., Ltd., Mar. 27, 1989.

Final Office Action cited in U.S. Appl. No. 10/380,756, dated Dec. 28, 2007.

Response to Final Office Action mailed Dec. 28, 2007, in U.S. Appl. No. 10/380,756, 10 pages.

* cited by examiner

DEVICE FOR PUNCTUAL MEASUREMENT OF A RADIOFREQUENCY MAGNETIC FIELD WITH CONSTANT AMPLITUDE AND FREQUENCY

CROSS-REFERENCE TO RELATED APPLICATIONS

This application is a continuation of U.S. patent application Ser. No. 10/380,756, entitled "Device For Punctual Measurement Of A Radiofrequency Magnetic Field With Constant Amplitude And Frequency", filed Apr. 4, 2003, which claims priority to PCT No. PCT/FR01/02897 which was filed on Sep. 18, 2001, which claims priority to FRANCE 00/11923, filed Sep. 19, 2000.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND

1. Field of the Invention

This invention relates to the field of measuring a magnetic field.

More precisely, this invention relates to a device for punctual measurement of a radiofrequency magnetic field with constant amplitude and frequency.

2. Description of the Related Art

Not Applicable.

SUMMARY

This invention is particularly but not exclusively applicable to contact-free card readers and particularly to readers for components with integrated coils.

The purpose of this invention is to propose a device capable of measuring the magnetic field generated by devices such as contact-free card readers, and particularly for systems with fields of about $10^{-3}$ Tesla.

To the best knowledge of the inventor, no device planned at the moment is fully satisfactory for this type of application.

The above-mentioned purpose is achieved within the scope of this invention by means of a device for measuring the radiofrequency magnetic field characterized by the fact that it comprises the following, on a common support:

a coil forming a primary reception antenna;
a voltage controlled oscillator, monitored so that its output frequency depends on the amplitude of the magnetic field received on the coil forming the primary antenna;
an absorption modulation load;
a secondary antenna sensitive to the magnetic field influenced by the absorption modulation resulting from the power supplied to the absorption modulation load as determined by the voltage controlled oscillator; and
circuitry for using the available signal on the secondary antenna.

According to another advantageous characteristic of the invention, the support consists of a card made of nonmagnetic material.

According to another advantageous characteristic of this invention, the device comprises a chip integrated on the support that includes the primary antenna, the voltage controlled oscillator and the absorption modulation load.

BRIEF DESCRIPTION OF THE DRAWING(S)

Other characteristics, purposes and advantages will become clear after reading the following detailed description with reference to the attached drawings given as a non-limitative example.

DETAILED DESCRIPTION OF THE PREFERRED EMBODIMENTS

Figure 1:
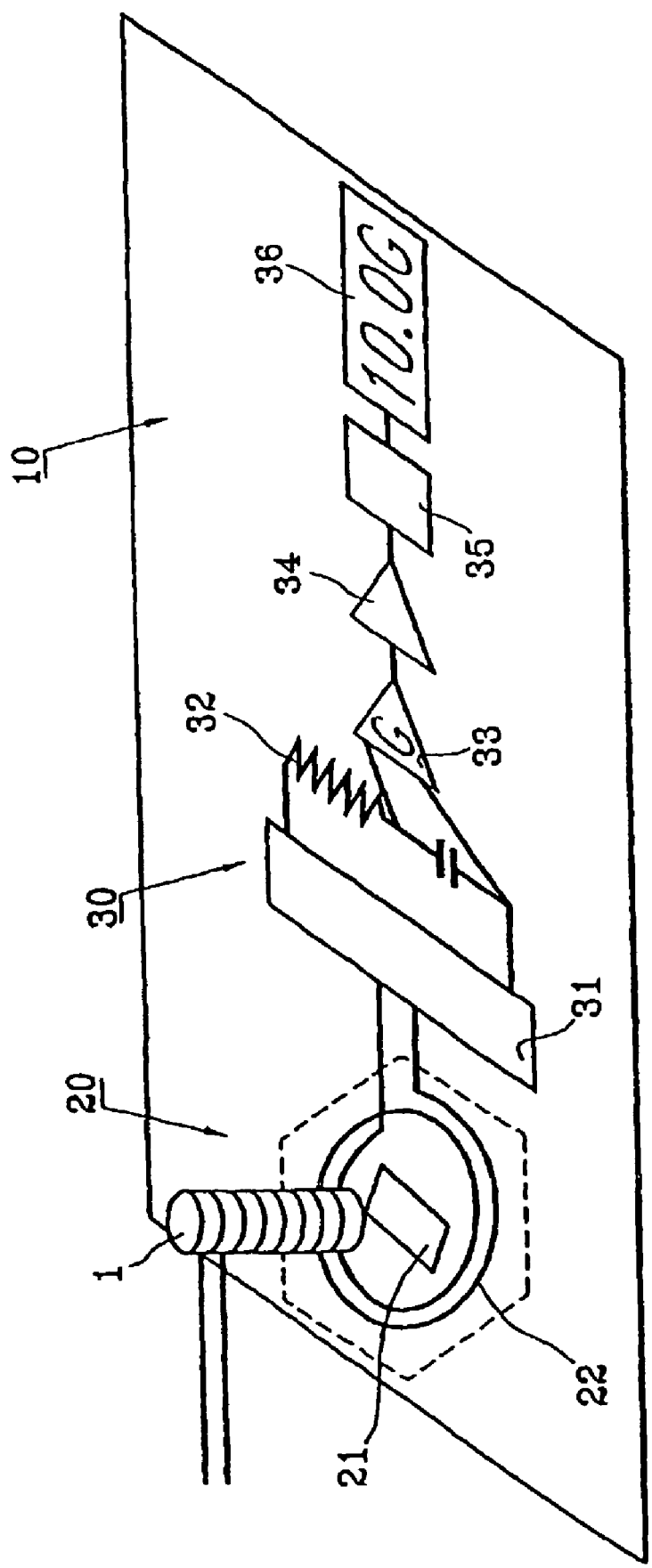
FIG. 1 illustrates one embodiment of a system including: an induction coil 1 of a contact-free card reader; and a card 10 forming a support, carrying the components used in a measurement device.

FIG. 1 diagrammatically shows the induction coil 1 of a contact-free card reader and a card forming a support 10, made of a non-magnetic material carrying all components used in the measurement device according to this invention.

Typically, but not limitatively, the induction coil 1 is adapted to emit a radiofrequency magnetic field with an amplitude of about $10^{-3}$ Tesla at a frequency of 13.56 MHz.

Typically, but not limitatively, the dimensions of the card are 55×85 mm.

The device according to this invention, for which the structure will be described in more detail later, comprises a small sensor 20 inserted in the magnetic field of the induction coil 1 that is capable of transmitting information about the captured energy to the exterior, and circuitry 30 for processing this information, to amplify, to calculate the value of the magnetic field at the precise location at which the said sensor 20 is located, and to display it as a direct readout on a display unit 36.

The sensor 20 is composed of:
firstly, a small electronic chip 21 (for example 1.4 mm side dimension) comprising an integrated coil forming a primary reception antenna AP, a VCO or voltage controlled oscillator, the frequency of which depends on the magnetic field in which the chip 21 is located, and an absorption modulation device MA to transmit frequency information from the said VCO to the exterior;
secondly, an antenna 22 composed of a few turns, for example 2 turns, of an electrical conductor wound tightly around the electronic chip 21 forming a secondary antenna.

Preferably, the absorption modulation device MA is formed from a resistance Rmod connected to the output from the voltage controlled oscillator. Furthermore, this voltage-controlled oscillator is preferably adapted to emit a signal with a frequency of between about 500 and 15000 Hz.

The magnetic field/frequency transfer function of the voltage-controlled oscillator is preferably calibrated in the laboratory.

Circuitry 30 is connected to the output from the secondary antenna 22. Thus, circuitry 30 receives a signal for which the basic frequency corresponds to the induction coil emission frequency and for which the amplitude is modulated at the same rate as the frequency generated by the voltage controlled oscillator, this frequency being representative of the amplitude of the magnetic field received on the chip 21.

There are several possible variants of circuitry 30 for using the signal available on the secondary antenna 22.

According to the particular but non-limitative embodiment illustrated in FIG. 1, circuitry 30 comprises: (a) an amplitude demodulator 31 connected to the output from sensor 20, more precisely to the output from the secondary coil 22, where the demodulator 31 outputs frequency information at a low level of the order of a few millivolts, (b) an RC filter 32 connected to the output from the demodulator 31, (c) an amplifier assembly 33 connected to the output from filter 32, with a sufficient gain to trigger (e) a comparator system 34 providing a logical level frequency output signal compatible with (f) processing means 35 that preferably uses a standard microcontroller, for example Motorola's MC68HC11 microcontroller.

This microcontroller 35 is programmed such that it calculates the value of the quasi punctual magnetic field available on chip 21, starting from the frequency information and using the transfer function mentioned above.

The program of the microcontroller 35 also manages the display of the value of the magnetic field, preferably calculated in gauss, in real time on a display 36. This display is preferably a liquid crystal display and is integrated on the support 10. However, if required, the display may be placed elsewhere on a module external to the support 10.

This invention may be used for applications in the field of measuring radiofrequency magnetic fields with constant amplitude and frequency, and particularly the adjustment of induction coils 1 used on very close contact-free card readers.

Figure 2:
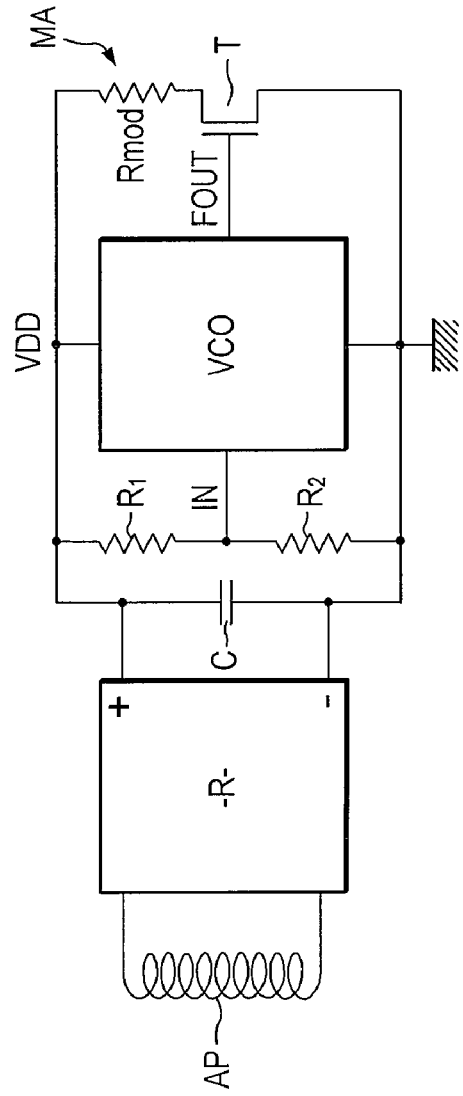
FIG. 2 illustrates an example embodiment of a chip that includes a primary antenna AP, a voltage controlled oscillator VCO and a modulation load MA.
Figure 3:
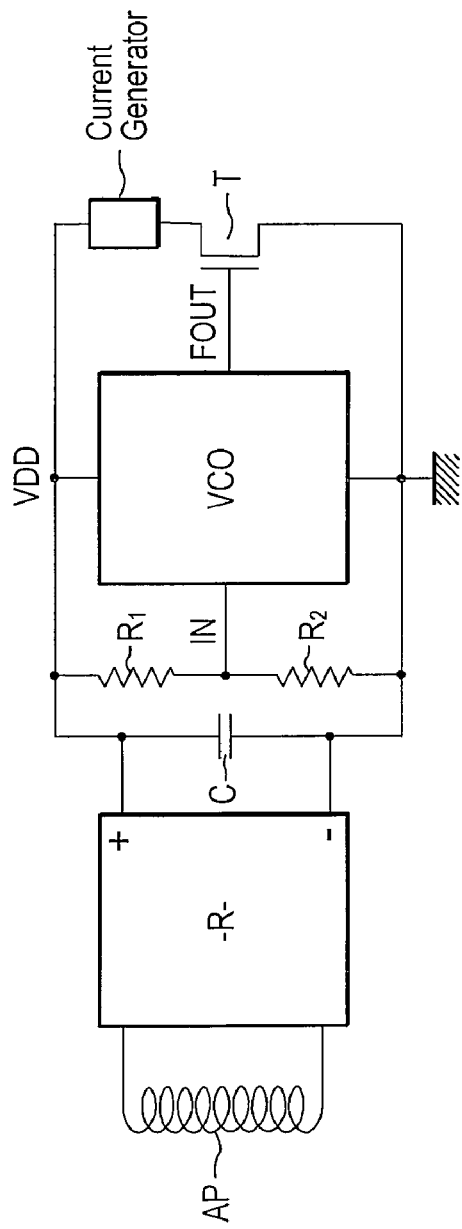
FIG. 3 illustrates an alternative embodiment of the chip that includes a current generator in place of the resistance Rmod of FIG. 2.

FIG. 2 illustrates an example of one embodiment of the chip 21 that includes the primary antenna AP, the voltage controlled oscillator VCO and the absorption modulation device MA.

In this example, the alternating voltage available at the output from the primary antenna AP is rectified by a rectifier R and filtered by a capacitor C to output a DC voltage VDD. This voltage is input to the voltage-controlled controlled oscillator VCO and controls the VCO through a resistive divider bridge R1/R2 powered by VDD. The modulation resistance Rmod is placed in series with the main conduction path of a switching transistor T at the terminals of the power supply VDD. The transistor T is controlled through the output from the VCO.

The DC current that passes through the modulation resistance Rmod is chopped at the same frequency as the VCO, which depends on the amplitude of the field received on the primary antenna AP. The alternating current at 13.56 MHz that passes through the primary antenna AP is modulated accordingly.

The primary antenna AP and secondary antenna 22 are closely coupled, this current induces an electromotive force (EMF) in the secondary antenna 22. This EMF is additional to the EMF induced by the induction coil 1 of the reader.

Therefore, the resulting EMF is an alternating voltage at 13.56 MHz slightly modulated in amplitude at the frequency of the VCO.

The modulation resistance Rmod must be sufficiently low to generate a current providing a detectable EMF, but it must not be too low to avoid degrading the retrieved DC voltage supplying power to the VCO. For example it can be 20 KΩ.

Obviously, this invention is not limited to the particular embodiment that has just been described, but includes any variant conform with its spirit.

Any device capable of consuming electrical power can be used for modulation. For example, the resistance could be replaced by a current generator.

The invention claimed is:

1. A method of using a device for determining a value of a magnetic field, the method comprising:
   said device rectifying an alternating voltage output from at least one coil in an alternating magnetic field;
   said device controlling a voltage controlled oscillator using the rectified voltage;
   said device outputting a signal from the voltage controlled oscillator, wherein the signal has a frequency that depends on an amplitude of the magnetic field at the at least one coil;
   said device chopping current in a modulation resistance connected between the rectified voltage and a switching device that receives the signal from the voltage controlled oscillator, wherein current through a modulation resistance is chopped at the frequency of the signal from the voltage controlled oscillator which results in modulating current in the at least one coil; and
   said device determining a value of the magnetic field by demodulating an output voltage of an antenna coupled to the at least one coil, wherein the output voltage alternates at a frequency of the magnetic field and is modulated in amplitude at the frequency of the signal from the voltage controlled oscillator;
   wherein said at least one coil, the voltage controlled oscillator, the modulation resistance and the antenna are carried by said device.

2. The method of claim 1, wherein said coupling of the antenna to the at least one coil is an electromagnetic coupling, wherein the device includes a support made of a non-magnetic material, wherein the support carries said at least one coil, the voltage controlled oscillator, the modulation resistance and the antenna.

3. A device comprising:
   a support, wherein the support carries:
      a first coil configured to generate a first current in response to receiving a magnetic field;
      a voltage controlled oscillator (VCO) configured to receive an input voltage that is dependent on an amplitude of the first current and to generate a first output voltage having a first frequency that is dependent upon the input voltage;
      a first load controllable by the first output voltage;
      an antenna coupled to the first coil such that an amplitude modulation of the first current in the first coil induces an amplitude modulation of a second output voltage of the antenna; and
      circuitry configured to operate on the second output voltage in order to output an indication of an intensity of the magnetic field.

4. The device of claim 3 further comprising:
   a rectifier configured to rectify the first current from the first coil in order to generate a rectified voltage that is dependent on the amplitude of the first current, wherein the VCO and the first load are coupled to receive the rectified voltage, wherein said input voltage of the VCO is a fraction of the rectified voltage.

5. The device of claim 4, wherein the first load includes a resistance and a transistor coupled in series, wherein the transistor is coupled to the VCO so that the first output voltage controls flow of second current through the first load.

6. The device of claim 4, wherein the first load is a current generator.

7. The device of claim 4, wherein the support is made of a non-magnetic material.

8. The device of claim 4, wherein the device is a card.

9. The device of claim 4, wherein the first coil, the VCO and the first load are included on a chip.

10. The device of claim 4, wherein the magnetic field is emitted by a second coil.

11. The device of claim 10, wherein the second coil is part of a contact-free card reader.

12. The device of claim 4, wherein the antenna surrounds the first coil, the VCO and the first load.

13. The device of claim 12, wherein the antenna comprises two or more turns of an electrical conductor wound collectively around the first coil, the VCO, and the first load.

14. The device of claim 4, wherein the circuitry includes a display unit for displaying said indication of the intensity of the magnetic field.

15. The device of claim 4, wherein the circuitry is configured to demodulate a first signal from the second output voltage, wherein the first signal alternates at the first frequency, wherein the circuitry is configured to operate on the first signal to estimate the first frequency and to compute said intensity of the magnetic field from the estimate of the first frequency.

16. The device according to claim 4, wherein the rectified voltage supplies power to the VCO.

17. The device of claim 3, wherein said coupling of the antenna to the first coil is an electromagnetic coupling, wherein the support is made of a non-magnetic material.

18. A device, comprising:
a support, wherein the support carries:
a first coil configured to generate a first current in response to receiving a magnetic field;
a rectifier coupled to the first coil, wherein the rectifier is configured to receive the first current and generate a rectified voltage that is dependent upon an amplitude of the first current;
a voltage controlled oscillator (VCO) configured to receive an input voltage that is a fraction of the rectified voltage and further configured to generate a first output voltage having a first frequency that is dependent upon the input voltage;
a first load coupled to receive the first output voltage, wherein the first load is configured to vary with said first output voltage;
an antenna coupled to said first coil such that an amplitude modulation of the first current in the first coil induces an amplitude modulation of a second output voltage of the antenna; and
circuitry configured to output an indication of a strength of the magnetic field based on the second output voltage.

19. The device of claim 18, wherein the circuitry includes a display unit for displaying the indication of the strength of the magnetic field.

20. The device of claim 18 wherein the magnetic field is emitted by a second coil.

21. The device of claim 18, wherein the antenna surrounds the first coil, the rectifier, the VCO and the first load.

22. The device of claim 18, wherein said coupling of the antenna to said first coil is an electromagnetic coupling, wherein the support is made of a non-magnetic material.

23. A system comprising:
an induction coil configured to emit an alternating magnetic field; and
a device comprising:
a first coil configured to generate a first current in response to receiving the alternating magnetic field;
a voltage controlled oscillator (VCO) configured to receive an input voltage that is dependent upon an amplitude of the first current and to generate a first output voltage having a first frequency that is dependent upon the input voltage;
a first load controllable by said first output voltage;
an antenna coupled to the first coil such that an amplitude modulation of the first current in the first coil induces a corresponding amplitude modulation of a second output voltage of the antenna; and
circuitry configured to operate on the second output voltage in order to output an indication of an intensity of the alternating magnetic field.

24. The system of claim 23, wherein the antenna surrounds the first coil, the VCO and the first load.

25. The system of claim 23, wherein said coupling of the antenna to the first coil is an electromagnetic coupling, wherein the device includes a support made of a non-magnetic material, wherein the support carries the first coil, the voltage controlled oscillator, the first load, the antenna and said circuitry.

26. A device comprising:
a card, wherein the card carries:
at least one coil;
a voltage controlled oscillator configured to produce an oscillating signal having an output frequency that depends on an amplitude of a magnetic field at the at least one coil;
an absorption modulation load, wherein current through the absorption modulation load is chopped at the output frequency of the voltage controlled oscillator which results in modulating current in the at least one coil;
an antenna coupled to the at least one coil, wherein the antenna is configured to provides an output signal that alternates at a frequency of the magnetic field and is modulated in amplitude at the output frequency of the voltage controlled oscillator; and
circuitry configured to operate on the output signal in order to output an indication of a strength of the magnetic field.

27. The device of claim 26, wherein said coupling of the antenna to said at least one coil is an electromagnetic coupling, wherein the card is made of a non-magnetic material.

28. A device comprising:
a support, wherein the support carries:
at least one coil;
a voltage controlled oscillator configured to generate a first output voltage whose frequency depends on an amplitude of a magnetic field at the at least one coil;
a current generator configured to generate a current that depends on the first output voltage;
an antenna coupled to the at least one coil, wherein the antenna is configured to provide a second output voltage alternating at a frequency of the magnetic field and modulated in amplitude at the output frequency of the voltage controlled oscillator; and
circuitry configured to operate on the second output voltage in order to output an indication of a strength of the magnetic field.

29. The device of claim 28, wherein the magnetic field is emitted by a second coil that is part of a contact-free card reader.

30. The device of claim 28, wherein said at least one coil, the voltage controlled oscillator and the current generator are included on a chip that is surrounded by the antenna.

31. The device of claim 28, wherein said coupling of the antenna to said at least one coil is an electromagnetic coupling, wherein the support is made of a non-magnetic material.

32. A device comprising:
a support, wherein the support carries:
  a first coil configured to generate a first current in response to receiving a magnetic field;
  a voltage controlled oscillator (VCO) configured to receive an input voltage that is dependent on an amplitude of the first current and to generate a first output voltage having a first frequency that is dependent upon the input voltage;
  a means for varying a load depending on the first output voltage;
  an antenna coupled to the first coil such that an amplitude modulation of the first current in the first coil induces an amplitude modulation of a second output voltage of the antenna; and
  circuitry configured to operate on the second output voltage in order to output an indication of an intensity of the magnetic field.

33. The device of claim 32 further comprising a means for rectifying the first current in order to generate a rectified signal, wherein the rectified signal determines the input voltage, wherein the rectified signal is supplied to said means for varying a load.

34. The device of claim 32, wherein said coupling of the antenna to the first coil is an electromagnetic coupling, wherein the support is made of a non-magnetic material.

* * * * *